United States Patent [19]

Goff et al.

[11] 4,083,250

[45] Apr. 11, 1978

[54] AUDIBLE ALARM FOOD THERMOMETER

[75] Inventors: Randall Goff, Weston; John M. Radbill, Winsted; Roger W. Pleasanton, Shelton, all of Conn.

[73] Assignee: Dresser Industries, Inc., Dallas, Tex.

[21] Appl. No.: 767,407

[22] Filed: Feb. 10, 1977

[51] Int. Cl.$^2$ .............................................. G01K 5/32
[52] U.S. Cl. ........................................ 73/352; 99/344
[58] Field of Search ................... 73/343 R, 352, 368.3; 99/344; 116/114.5, 103, 102, 101

[56] References Cited

U.S. PATENT DOCUMENTS

| | | | |
|---|---|---|---|
| 2,546,608 | 3/1951 | Melick | 116/103 X |
| 3,212,337 | 10/1965 | McCarrick | 73/368.3 |
| 3,626,897 | 12/1971 | Kliewer | 116/114.5 |
| 3,830,191 | 8/1974 | Burke | 73/352 X |

FOREIGN PATENT DOCUMENTS

| | | | |
|---|---|---|---|
| 346,779 | 1/1922 | Germany | 99/344 |
| 490,713 | 8/1938 | United Kingdom | 99/344 |

*Primary Examiner*—Daniel M. Yasich
*Attorney, Agent, or Firm*—Daniel Rubin

[57] ABSTRACT

A portable food thermometer affording an audible alarm at a preset cooking completion temperature. A water reservoir defined within a two-part housing is fillable by the user in advance of use. An elongated sensing probe insertable in the food is secured extending through one of the housing parts inward of the reservoir and contains a slideable rod supported on a confined temperature sensing material. Expansion of the sensing material in response to increasing food temperature forces the rod outward of the probe. Opposite the free end of the rod is a spring loaded ball valve sealing the reservoir from a whistle outlet. Temperature graduations on the housing enable adjusting the spacing between the rod and valve at room temperature for presetting the operating temperature of the unit. On reaching set point cooking temperature, the outwardly forced position of the rod acts to open the valve enabling steam in the reservoir to activate the whistle alarm. When the alarm is activated, a plug positioned in the whistle outlet is displaced outwardly for affording a visual indication of thermometer operation.

10 Claims, 3 Drawing Figures

AUDIBLE ALARM FOOD THERMOMETER

BACKGROUND OF THE INVENTION

1. The field of art to which the invention pertains includes the art of measuring and testing as related to food thermometer apparatus.

2. Oven cooking food thermometers are recognized as a very useful kitchen appliance and are, therefore, widely employed both commercially and domestically. By inserting the temperature sensitive probe of the thermometer into the uncooked food, usually meat to be roasted, the thermometer will sense the internal food temperature and over a period of time in the oven will provide an indication of cooking completion. Most oven cooking thermometers are of the visual type enabling external temperature readout reflecting the internal food temperature which can then be correlated to the state of cooking completion. Exemplifying thermometers of this type are the disclosures of U.S. Pat. Nos. 2,276,178; 3,626,897 and 3,820,499. The obvious deficiency of such thermometers is the requirement for frequent checking of the readout temperature to avoid inadvertent overcooking. The latter, of course, can represent a problem of some magnitude with a particularly busy chef. A food thermometer for producing an audible alarm at preset food temperatures is disclosed in U.S. Pat. No. 3,778,798. While overcoming the deficiency of the visual type thermometer, the latter represents a relatively sophisticated and complex unit and is generally available only as a permanent part of the oven with which it is supplied.

Despite recognition of the foregoing, it has not been known heretofore how to produce a portable cooking thermometer of the audible alarm type that is presettable yet sufficiently economical to manufacture as to be affordable as a separate accessory item for conventional domestic use.

SUMMARY OF THE INVENTION

The invention relates to food thermometers and more specifically to such a thermometer which is portable yet presettable to an operating temperature for producing an audible alarm when the cooking completion temperature of the food has been attained. This is achieved in accordance herewith by means of a water reservoir defined in one part of a two-part housing that is prefilled with water by the user. An elongated sensor probe extending through the reservoir contains a slideable rod supported on a confined temperature sensitive material. Opposite the free end of the rod adjustably prespaced a distance correlated to the operating temperature of the thermometer is a ball valve spring biased toward sealing the reservoir from a whistle outlet. With the probe inserted in the food and the thermometer oriented above the horizontal, increases in food temperature causes expansion of the temperature sensitive material forcing the rod toward the ball valve. On attaining the preset operating temperature, the ball is forced from its seat permitting steam formed of the water by the oven temperature to escape. The escaping steam then moves past the valve to produce an audible sound through the whistle outlet. With a valve spring of selected spring rate in combination with the known seating area of the valve, excess steam pressure as might occur from excess oven temperature can unseat the ball to similarly activate the whistle. Providing a visual indication of the thermometer being actuated is a loose plug normally situated in the whistle outlet and which is displaced outward by the escaping steam.

It is therefore an object of the invention to provide a novel food thermometer.

It is a further object of the invention to provide a novel presettable food thermometer which produces an audible alarm when the internal food temperature attains the adjusted set point temperature of the thermometer.

It is a further object of the invention to provide a novel food thermometer as in the previous object also able to produce an audible alarm in the event of an excess oven temperature.

It is a further object of the invention to provide a novel audible alarm food thermometer that provides a visual indication of actuation along with actuation of the audible alarm.

It is a still further object of the invention to effect the foregoing objects in a portable and relatively economical construction that is available as an accessory item.

Figure 1:
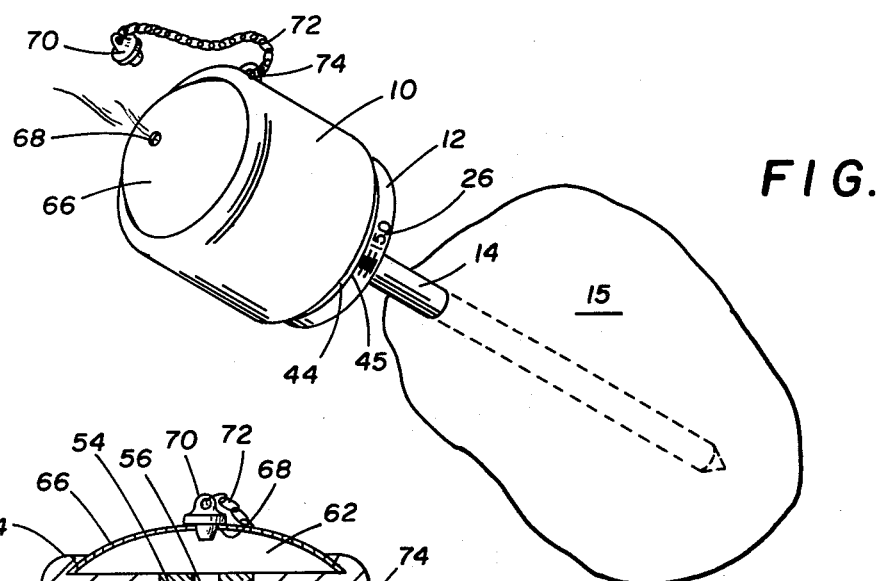
FIG. 1 is an isometric view of the food cooking thermometer in accordance herewith.

Referring now to the drawings, the thermometer in accordance herewith is comprised of a two-part housing including a top part 10 and a lower part 12. Secured extending through the lower part is a thin elongated sensor probe 14 shown inserted in poultry 15. The probe terminates at its outward end in a closed point formation 16 while its opposite internal end 18 terminates slightly above end face 20 of bottom housing part 12. Surrounding the probe internally of the housing is an annular pocket 22 comprising a water reservoir. The top periphery of housing part 12 is threaded at 24 beneath which is formed an annular recess 28 containing O-ring seal 30. On its lower periphery is included set point temperature indicia 26 operable as will be understood.

Probe 14 includes an external tubular envelope 31 forming a small diameter internal passage 32. The lower portion of passage 32 is filled with a controlled volume temperature sensing material 34 of predictable thermal expansion characteristics. Typically, material 34 can comprise a wax or silicon rubber of a fairly viscous composition when exposed to the elevated temperatures to be anticipated. Slideably supported closely fit in passage 32 on the topside of the temperature sensing material is an elongated rod or plunger 36, the free end 38 of which extends outward beyond probe end 18.

Top housing part 10 is formed as a sleeve-like cap construction where at its lower end it is internally threaded at 40 about an open ended cavity 39. Threads 40 cooperate with threads 24 of housing part 12 for securing and adjusting the housing parts relative to each other. Beneath threads 40, the lowermost section 42 of the sleeve cooperated with O-ring gasket 30 for forming a pressure-tight seal therebetween while a bevel 44 at its terminal end defines a reference edge 45 operable in conjunction with temperature indicia scale 26.

Centrally communicating with cavity 39 in upper housing part 10 is a small diameter bore 46 spherically dished at 48 and opening into a coaxial counterbore 50 leading to a further counterbore 52. Contained in counterbore 52 is a force fit plug 54 centrally apertured at 56 and serving to compress a coil spring 58 for biasing a ball 60 into a valve seating relation against dished seat 48 to releasably seal bore 46. Contained in the top face of housing part 10 is a recess 62 formed inwardly of peripheral flange 64 for supporting a concave spring-like plate 66 having a whistle opening 68. Normally positioned within opening 68 is a push fitting plug 70 attached to a chain 72 in turn secured to an eye-bolt 74. On each occasion of the thermometer being actuated, plug 70 blows out to provide a visual indication of operation. This feature is particularly useful if, for example, the user was out of hearing range when actuation occurred. For that purpose, the fit of plug 70 in aperture 68 should be sized to blow out at a pressure lower than steam pressure corresponding to minimum oven temperature, e.g. 300° F. (approximately 52 psig.).

In operation, housing parts 10 and 12 are first disassembled and reservoir 22 filled with water to the level of face 20. After filling, the two housing parts are threadedly connected with top part 10 advanced over bottom part 12 until bevel edge 45 registers with a presettable temperature indicia 26 comprising the set point temperature at which the unit is to be operative. In so doing, a distance "X" is established to represent the expansion distance to be consumed between the top end 38 of rod 36 and the underside of ball 60. With the probe 14 inserted inward of food 15 and placed together in an oven, appropriate cooking temperature will quickly convert water in reservoir 22 into steam.

Figure 2:
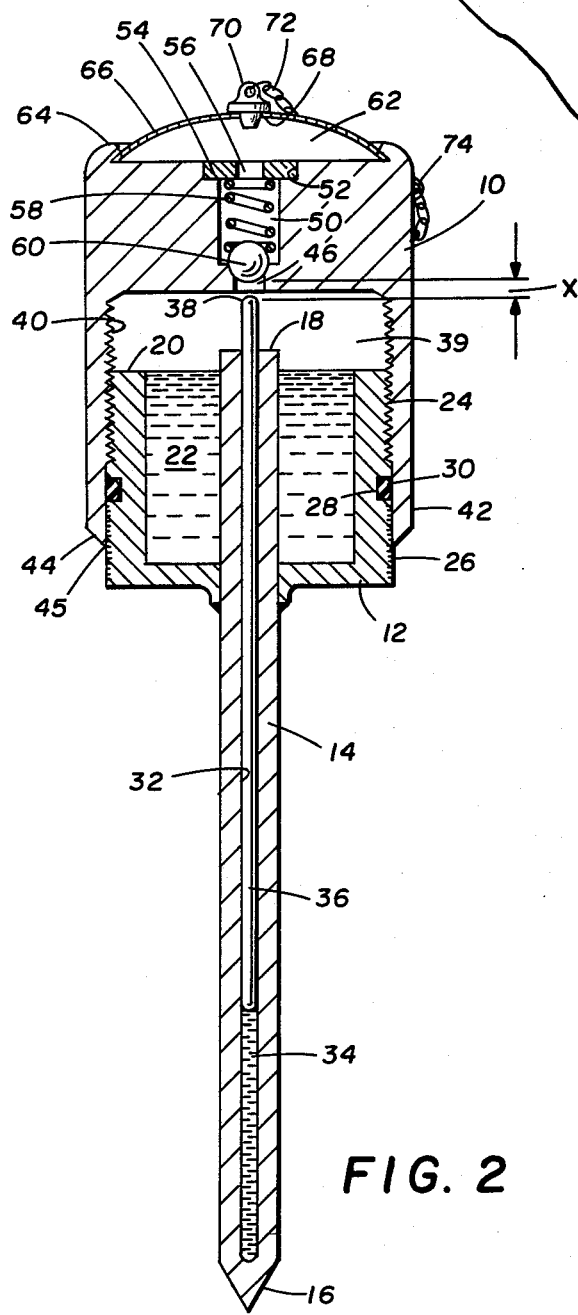
FIG. 2 is a sectional elevation through the thermometer in its preset room temperature relation.
Figure 3:
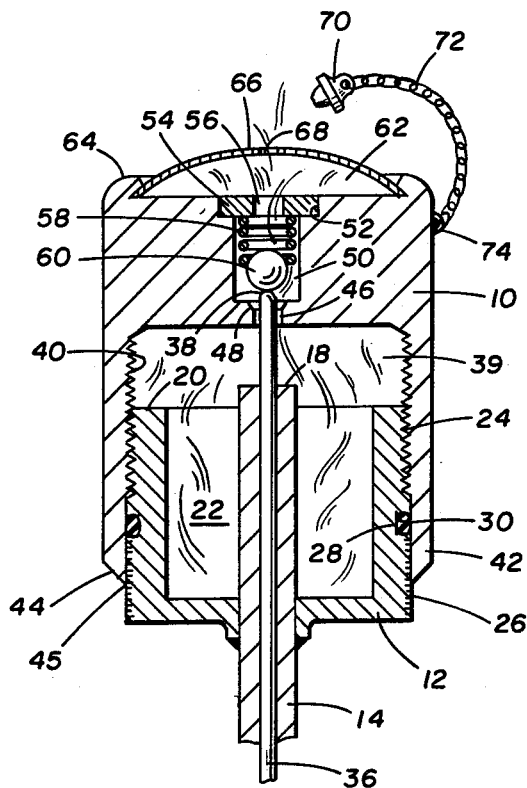
FIG. 3 is a fragmentary sectional elevation of the food thermometer at its cooking completion operating relation.

As the food temperature begins to rise, temperature sensing material 34 incurs expansion in turn forcing rod 36 upward toward ball 60. On reaching the set point temperature, continued movement of the rod forces its end 38 inward of opening 46 to raise ball 60 from its seated position of FIG. 2 to the unseated position of FIG. 3. Raising the ball in this manner releases the seal of ball 60 and enables steam in the reservoir to escape outwardly through aperture 56 and past whistle opening 68 to produce an audible alarm indicative of the set point temperature of the food having been attained. Should oven temperature be excessive over that normally contemplated, excessive steam pressure will similarly enable rod 36 to force ball 60 from its seat for producing a whistle sound through outlet 68. When actuated for either reason, plug 70 is blown from aperture 68 at the onset thus providing a visual indication of operation. The latter serves a dual purpose in the event the user was out of hearing range when the audible alarm was sounded while also acting as safety feature alerting the user to an overtemperature oven from which food destruction and/or fire could occur.

By the above description there is disclosed a novel food thermometer able to be adjustably preset by the user to an operating temperature which when attained will produce an audible alarm signifying the fact to the user. The benefit thereof is to eliminate the need for constant and frequent visual checks of a visual thermometer in the manner of the prior art with a simple and economical construction enabling availability of such units as an inexpensive accessory item.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privelege is claimed are defined as follows:

1. An audible alarm food thermometer comprising in combination:
    a. a two-part detachable housing internally defining a water reservoir;
    b. a temperature sensitive probe secured to one of said housing parts, said probe being insertable into food for sensing internal food temperature while said housing remains outward of the food for exposure to elevated cooking temperatures at which the food is to be prepared;
    c. presettable means associated with said housing for adjustably varying the set point temperature at which food temperature sensed by said probe is to effect an audible alarm;
    d. seal means operable when probe sensed temperature is below said set point temperature to seal said reservoir against escape of steam generated from water in the reservoir exposed to the cooking temperature;
    e. release means operable in opposition to said seal means to force release of said seal mean when the probe sensed temperature is above said set point temperature; and
    f. whistle means supported in the steam escape path from said reservoir for producing an audible alarm.

2. A food thermometer according to claim 1 in which said seal means comprises a valve, and said release means comprises a valve actuator operable in response to increasing temperature sensed by said probe to move toward forcing said valve from its closed to its open position.

3. A food thermometer according to claim 2 in which said probe is tubular, there is included a temperature expansive material contained extending inward from the distal end of said probe and said valve actuator comprises a rod slideably supported in said probe from a position of engagement with said temperature expansive material.

4. A food thermometer according to claim 3 in which said presettable means comprises means to attach said housing parts in an adjustable telescoping sealed relation for effecting a controlled spacing between said valve and the free end of said rod.

5. A food thermometer according to claim 4 in which said housing parts are threadedly joined in effecting said telescoping relation and a viewable surface of one of said parts includes temperature indicia with which a reference on the other said parts is positioned in registration for effecting said controlled spacing.

6. A food thermometer according to claim 4 in which said valve comprises a passage in communication with said reservoir, an annular seat surrounding said passage, a closure member movable toward and away from said seat for closing and opening said passage respectively, and spring means urging said closure member toward said seat in opposition to steam pressure in said reservoir.

7. A food thermometer according to claim 6 in which said valve is located in the steam escape path intermediate between said reservoir and said whistle means.

8. A food thermometer according to claim 7 in which said closure member comprises a sphere.

9. A food thermometer according to claim 7 in which said whistle means comprises a whistle size aperture communicating between said steam escape path and the surrounding atmosphere and there is included a plug adapted to be positioned in said whistle aperture to be displaced therefrom in response to an onset of steam escaping past said valve.

10. A food thermometer according to claim 9 in which at least the reservoir defining portion of said housing is exposed to oven temperature and said plug is subject to displacement therefrom by escaping steam of a pressure corresponding to a predetermined overtemperature of the oven for overriding the sensed condition of said probe.

* * * * *